Figure 1:
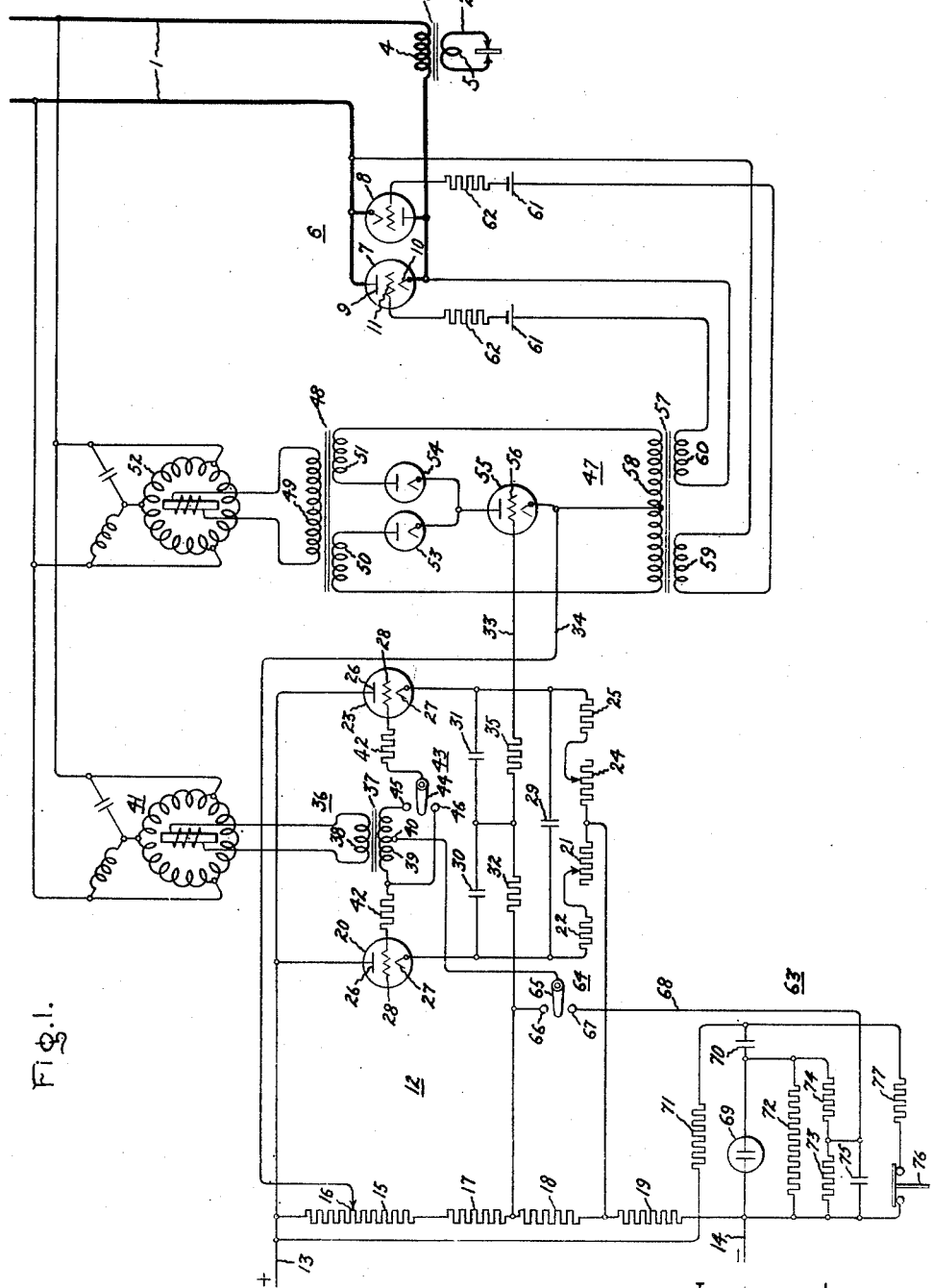

July 18, 1939.                H. W. LORD                    2,166,310
                         ELECTRIC VALVE CIRCUIT
                         Filed June 2, 1937         4 Sheets-Sheet 1

Inventor:
Harold W. Lord,
by Harry E. Dunham
His Attorney.

July 18, 1939.  H. W. LORD  2,166,310
ELECTRIC VALVE CIRCUIT
Filed June 2, 1937    4 Sheets-Sheet 2

Inventor:
Harold W. Lord,
by Harry E. Dunham
His Attorney.

July 18, 1939.  H. W. LORD  2,166,310
ELECTRIC VALVE CIRCUIT
Filed June 2, 1937  4 Sheets-Sheet 3

Inventor:
Harold W. Lord,
by Harry E. Dunham
His Attorney.

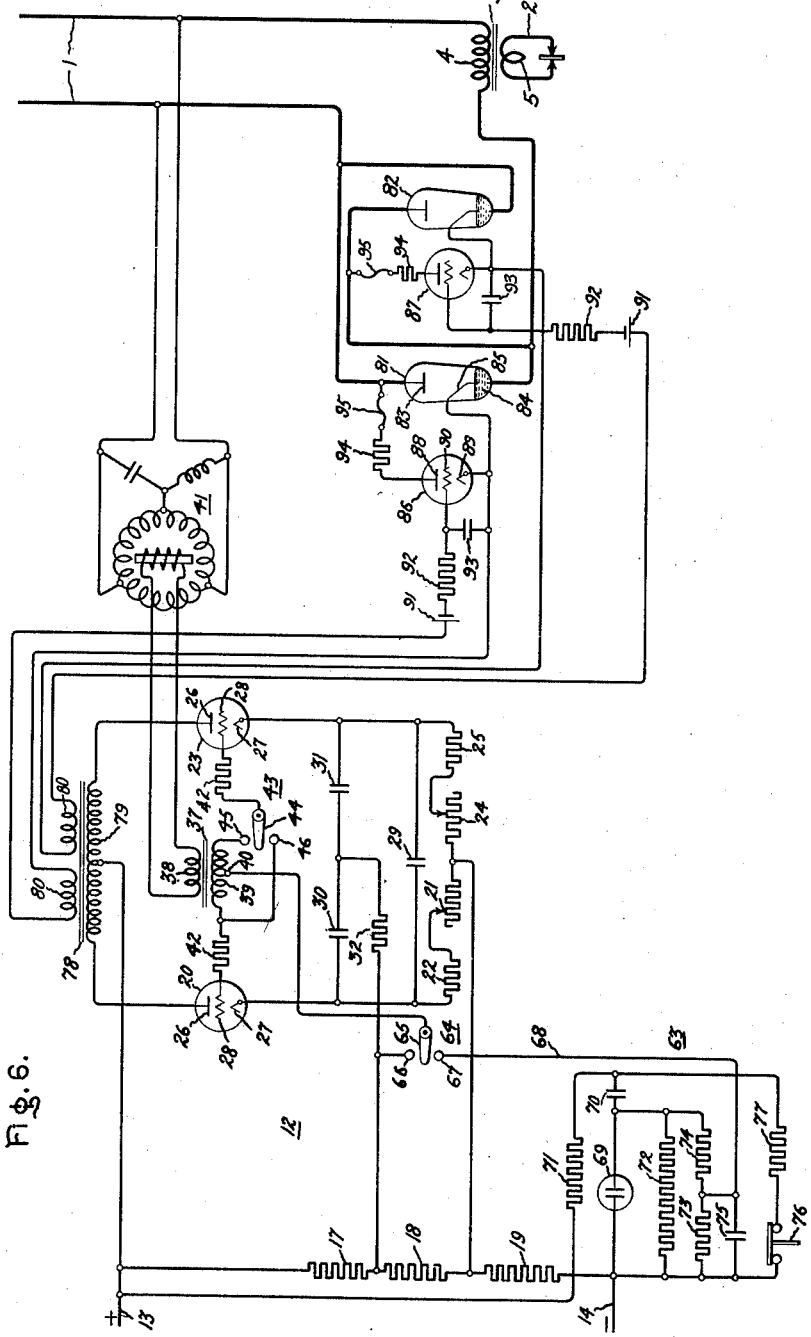

Patented July 18, 1939

2,166,310

UNITED STATES PATENT OFFICE 2,166,310

ELECTRIC VALVE CIRCUIT

Harold W. Lord, Schenectady, N. Y., assignor to General Electric Company, a corporation of New York Application June 2, 1937, Serial No. 146,019

30 Claims. (Cl. 250—27)

My invention relates to electric valve circuits and more particularly to electric valve arrangements for generating periodic electrical impulses.

Heretofore there have been devised numerous electric valve circuits for periodically transferring energy from an alternating current supply circuit to an associated load circuit. In electric translating apparatus of this nature employing electric valve means, it is desirable to control the associated electric valve apparatus so that consecutive energizations of the load circuit begin during half cycles of voltage of opposite polarity of the supply circuit in order that excessively heavy current conditions are not imposed on the electric valve equipment. For example, in electric welding systems intended for spot welding operation and line or seam welding operation, it has been found expedient to control the electric valve apparatus so that the consecutive intervals of conduction begin during half cycles of voltage of opposite polarity to prevent saturation of the associated inductive equipment and to prevent thereby the flow of excessively large currents which may become injurious to the apparatus. Many of the prior art arrangements have necessitated the employment of complicated and expensive electromechanical devices to effect this type of control, and it has become evident that there is a decided need for electric valve apparatus which is entirely electrical in nature and operation and which is susceptible of a wide range of application for effecting this control.

It is an object of my invention to provide a new and improved electric valve translating system.

It is another object of my invention to provide a new and improved electric valve circuit for generating periodic electrical quantities.

It is a further object of my invention to provide a new and improved electric valve system whereby intermittent energization of an associated load circuit may be effected and whereby the intermittent energizations are initiated during half cycles of voltage of opposite polarity of an associated alternating current supply circuit.

In accordance with the illustrated embodiments of my invention, I provide a new and improved electric valve circuit for effecting periodic or intermittent energization of a load circuit, such as a welding circuit, from an alternating current supply circuit wherein the succeeding or consecutive intervals of energization are initiated during half cycles of voltage of opposite polarity of an alternating current supply circuit. A pair of oppositely connected electric valve means are interposed between the supply circuit and the load circuit to control the transfer of energy between the circuits. I provide an electric valve control circuit entirely electrical in nature and operation for controlling the conductivity of electric valve means to effect this periodic or intermittent energization of the load circuit. The electric valve control circuit also functions as a polarity selector, or, in other words, as a means for initiating successive or consecutive energizations of the load circuit during half cycles of voltage of opposite polarity of the alternating current supply circuit. The polarity selector, or the control circuit, comprises a source of direct current and a pair of parallel electric paths which are connected to be energized from the direct current source. Each of the parallel paths includes a serially connected electric valve and an impedance element. A capacitance is connected across the parallel paths and is alternately charged in opposite directions from the direct current source through the electric valves in the parallel paths. During such periods of charge and discharge, the circuit generates electrical impulses and the capacitance also serves to commutate the current between the parallel paths. After one of the electric valves in the parallel paths is rendered conductive, that path remains conductive until the electric valve in the other path is rendered conductive, at which time an electrical impulse is generated. I provide an excitation circuit energized from the alternating current supply circuit for rendering the electric valves in the parallel paths conductive by impressing on control members thereof voltages which are in phase or 180 electrical degrees out of phase. When the voltages impressed on the control members are in phase the electrical impulses will be generated during half cycles of voltage of a predetermined polarity of the associated alternating current circuit, and when the voltages are 180 electrical degrees out of phase consecutive electrical impulses will be generated during half cycles of voltage of opposite polarity of the alternating current supply circuit.

Another feature of my invention concerns the employment of an electrical discharge device of the glow discharge type for controlling a circuit for generating periodic electrical impulses so that the circuit supplies only a predetermined number of electrical impulses in accordance with a predetermined circuit controlling operation.

For a better understanding of my invention, reference may be had to the following description taken in connection with the accompanying drawings and its scope will be pointed out in the appended claims. Fig. 1 of the accompanying drawings diagrammatically shows an embodiment of my invention as applied to a welding circuit, and Figs. 2, 3, 4 and 5 represent certain operating characteristics thereof. Fig. 6 represents a modified embodiment of my invention also applied to a welding system.

In Fig. 1 of the accompanying drawings I have diagrammatically shown my invention as applied to an electric valve translating system for transmitting energy from an alternating current circuit 1 to a load circuit, such as a welding circuit 2, through a transformer 3 for controlling the transfer of energy between the circuits. The transformer 3 may be provided with a primary winding 4 and a secondary winding 5. In order to control the voltage impressed on the primary winding 4 of transformer 3 and hence to control the transfer of energy from the supply circuit 1 to the load circuit 2, I employ an electric valve means 6 which may include a pair of reversely connected electric valves 7 and 8, each having an anode 9, a cathode 10 and a control member 11, and which are preferably of the type employing an ionizable medium such as a gas or a vapor. Since the electric valves 7 and 8 are reversely connected in parallel, it is clear that alternating current may be transmitted to the load circuit 2 from the alternating supply circuit 1.

In order to control the conductivities of electric valves 7 and 8 to transmit current periodically to the load circuit 2 and to control these electric valves so that the periods of energization begin during half cycles of voltage of like polarity or during half cycles of voltage of opposite polarity of the alternating current supply circuit 1, I provide a circuit 12 which may be termed a polarity selector. The circuit 12 includes a source of direct current including a positive terminal 13 and a negative terminal 14, a voltage divider including resistance 15 having an adjustable tap 16, and resistances 17, 18 and 19 which are serially connected across the direct current source, and a pair of parallel electric paths which are energized from the direct current source. One of the parallel electric paths includes a serially connected electric valve 20 and an impedance element 21 which is adjustable. A current limiting resistance 22 may also be connected in series relation with the electric valve 20 and the adjustable impedance 21. The other parallel path includes a serially connected electric valve 23 and an adjustable impedance 24, and a current limiting resistance 25 may be connected in series relation therewith if desired. The electric valves 20 and 23 are preferably of the type employing an ionizable medium, such as a gas or a vapor, and each includes an anode 26, a cathode 27 and a control member 28. A capacitance 29 is connected across the parallel paths and is alternately charged in opposite directions from the direct current source through electric valves 20 and 23 and impedances 24, 25 and 21, 22, respectively. The capacitance 29 effects commutation of current between the parallel paths and assists in generating an electrical impulse each time either electric valve 20 or electric valve 23 is rendered conductive. In order to generate a positive impulse irrespective of which path is rendered conductive, I provide a voltage divider connected across the parallel paths including a pair of serially connected capacitances 30 and 31, the common juncture of which is connected to a suitable terminal of the voltage divider such as, for example, the common juncture of resistances 17 and 18, through a resistance 32, and is also connected to a control circuit including conductors 33 and 34. A resistance 35 may be connected in series relation with the conductor 33, and the conductor 34 is connected to adjustable contact 16 of resistance 15.

I provide an excitation circuit 36 which is energized from the alternating current circuit 1 and includes a transformer 37 having a primary winding 38 and a secondary winding 39 provided with an electrical neutral connection 40. Transformer 37 is preferably of the type designed to supply an alternating voltage of peaked wave form. The excitation circuit 36 also includes a phase shifting arrangement, such as a rotary phase shifting device 41, which may be employed to control the phase of the voltage impressed on primary winding 38 of transformer 37. The lefthand portion of secondary winding 39 of transformer 37 may be permanently connected to control member 28 of electric valve 20 through a current limiting resistance 42, and a suitable circuit controlling means, such as a switch 43 having a movable contact member 44 and stationary contacts 45 and 46, is provided to impress on control member 28 of electric valve 23 an alternating voltage which is in phase or 180 electrical degrees out of phase with the alternating voltage impressed on control member 28 of electric valve 20. When the movable contact member 44 is in engagement with stationary contact 45, the voltages impressed on control members 28 of electric valves 20 and 23 are displaced by 180 electrical degrees, and when the movable contact member 44 is in engagement with stationary contact 46 the voltages impressed on these control members are in phase. In other words, when the movable contact member 44 is in engagement with contact 45, the circuit 12 is connected for antipolar operation or energization of the load circuit 2, and when the movable contact member 44 engages contact 46 the circuit is in condition for unipolar operation. By antipolar operation, I refer to that type of operation in which succeeding or consecutive intervals of energization of the load circuit 2 begin during half cycles of voltage of opposite polarity of the alternating current circuit 1, and by unipolar operation I refer to that type of control in which succeeding or consecutive intervals of energization begin during half cycles of voltage of the same polarity of circuit 1.

As an agency for applying to the control members 11 of electric valves 7 and 8 voltages of suitable wave form for rendering these valves conductive during the desired intervals of energization and to accomplish this control by employing only a minimum of apparatus, I employ a circuit 47 which is disclosed and broadly claimed in my copending patent application Serial No. 138,809, filed April 24, 1937, and assigned to the assignee of the present application. The circuit 47 includes a device such as a transformer 48 designed to provide an alternating voltage of peaked wave form and comprises a primary winding 49 and secondary windings 50 and 51. Any suitable phase shifting arrangement, such as a rotary phase shifter 52, may be employed to control the phase of the alternating voltage impressed on primary winding 49 and hence to control the phase relationship of the alternating voltages impressed on control members 11 to the voltages impressed on the respective anodes of electric valves 7 and 8, providing thereby an expedient arrangement for controlling the amount of energy transmitted to the load circuit 2 during each half cycle of voltage of the alternating current circuit 1 during predetermined intervals of conduction. Suitable unidirectional conducting devices, such as electronic discharge devices 53 and 54, are connected in series relation with secondary windings 50 and 51 to impress on serially connected electric valve 55 rectified impulses of alternating current which are of peaked wave form. The electric valve 55 is preferably of the type employing an ionizable medium such as a gas or a vapor and includes a control member 56 for rendering the valve conductive. By virtue of this particular type of circuit I provide an arrangement whereby the flow of full wave current is controlled by employment of only one controlled rectifier. A transformer 57, having a primary winding 58 which is energized from secondary windings 50 and 51 of transformer 48 through electric valves 53, 54 and 55, impresses alternating voltages of peaked wave form on control members 11 of electric valves 7 and 8 through secondary windings 59 and 60. Suitable sources of negative unidirectional biasing potential, such as batteries 61, may be connected in series relation with control members 11 and current limiting resistances 62 may also be connected in series relation therewith.

To control the polarity selector or periodic electrical impulse generator 12 so that the circuit supplies only a predetermined number of electrical impulses in response to a predetermined circuit controlling operation, I provide a circuit 63 which impresses on control members 28 of electric valves 20 and 23 a negative unidirectional biasing voltage of variable magnitude to permit the circuit 12 to transmit the desired number of impulses. The circuit 63 is connected to the circuit 12 through a suitable circuit controlling device, such as a switch 64 having a movable contact member 65 and stationary contact members 66 and 67. When the movable contact member 65 engages contact 66, the circuit 12 is in condition to generate trains of electrical impulses having a predetermined periodicity established by the constants of circuit 12, principally by the magnitude of capacitance 29 and impedances 21 and 24. When the movable contact member 65 of switch 64 is in engagement with contact 67, the circuit 12 is in condition to generate only a certain number of electrical impulses in response to a predetermined circuit controlling or initiating operation. The circuit 63, which may be termed a hold-off circuit, will impress a negative unidirectional biasing potential on control members 28 of electric valves 20 and 23 when the switch 64 is in the lower position. A conductor 68 connects the circuit 63 to contact 67 of switch 64. The circuit 63 includes a serially connected electric valve 69 of the glow discharge type, a capacitance 70 and a resistance 71 which are connected between positive terminal 13 and negative terminal 14 of the direct current source. An impedance, such as a resistance 72 of relatively large value, is connected across the glow discharge valve 69. A voltage divider includes a pair of serially connected resistances 73 and 74 and a capacitance 75 connected across resistance 73, is employed to impress on control members 28 of electric valves 20 and 23 a variable negative unidirectional biasing potential. In order to initiate the operation of the circuit 63 and hence to control circuit 12 so that this circuit supplies only a predetermined number of impulses or only one electrical impulse, I provide a suitable circuit controlling device such as a switch or contactor 76 which is connected in series relation with a resistance 77 across glow discharge valve 69 and capacitance 70. When the switch 76 is in the closed circuit position, the circuits including glow discharge valve 69 and capacitance 70 are effectively short circuited, and when the switch 76 is in the open position the voltage of the direct current source including conductors 13 and 14 will be impressed across glow discharge valves 69 and capacitance 70 to permit temporary breakdown of the ionizable medium of glow discharge valve 69. It is to be understood that the switch 76 may be adapted to be manually or automatically operated. In the latter case, it is to be further understood that if the switch 76 is automatically operated I may employ any conventional control circuit for effecting operation thereof.

The operation of the embodiment of my invention diagrammatically shown in Fig. 1 will be explained when the electric valve translating apparatus thereof is operating to effect periodic energization of the load circuit 2. To effect this type of control, movable contact member 65 of switch 64 is moved to engage contact 66 so that the circuit 12 operates as a generator of periodic electrical impulses, the periodicity of which is controlled by the constants of the circuit. Prior to the consideration of the operation of the system as a unit, the operation of the individual circuits will be considered.

Circuit 12 operates as a generator of periodic electrical impulses having a predetermined periodicity when the switch 64 is in the upper position. For the purpose of explaining the operation of circuit 12, let it be assumed that the switch 43 is moved to the upper position so that contact 44 engages contact 45 in which case the alternating voltages impressed on control members 28 of electric valves 20 and 23 will be 180 electrical degrees out of phase; that is, the circuit is in condition for antipolar operation. Let it be assumed that the electric valve 20 is first rendered conductive and that this electric valve will charge capacitance 29 from the direct current source through a circuit including electric valve 20, capacitance 29, resistance 25, resistance 24 and resistance 19. When the capacitance 29 is completely charged, the electric valve 20 will be maintained conductive by virtue of the conduction of current through the circuit including electric valve 20, resistance 22, resistance 21 and resistance 19. It, of course, will be understood that during this period of operation, the left-hand plates of capacitances 30 and 31 will be charged positively relative to the right-hand plates. An electrical impulse will be impressed on control circuit including conductors 33 and 34 during the charging operation of the capacitance 29, and this periodic impulse will be impressed on control member 56 of electric valve 55. The resultant voltage impressed on the control members 28 of electric valves 20 and 23 is the sum of three components of voltage, one component being the alternating component impressed thereon by secondary winding 39, a second component being a negative component of the periodic electrical impulses impressed on the control members through a circuit including either resistances 21, 22 or 24, 25, resistance 18, switch 64, primary winding 39 and resistances 42, and a third component due to a positive bias voltage derived from the voltage divider. Upon rendering one of the electric valves conductive, the cathode potential of the previously conducting valve, due to the charge on capacitance 29, is temporarily raised to a potential greater than that impressed on the associated anode so that the previously conducting electric valve is rendered nonconducting, thereby permitting the control member to regain control. The potential of the cathode decreases exponentially until the voltage of peaked wave form impressed on the control members is sufficient to overcome the net bias voltage to initiate a discharge in the then nonconducting electric valve by the alternating voltage impressed on the associated control member by secondary winding 39 of transformer 37. For example, electric valve 23 will be rendered conductive a predetermined time after electric valve 20 has been rendered conductive, the time interval being established principally by the time constant of the circuit including capacitance 29 and resistances 21, 22 or 24, 25. Of course, when electric valve 23 is rendered conductive, the capacitance 29 will be charged in the opposite direction from the direct current source through a circuit including electric valve 23, capacitance 29, resistance 22, resistance 21 and resistance 19. During this operation there will be impressed on the control circuit including conductors 33 and 34 another electrical impulse. It is to be noted that since the excitation circuit 36 is connected to the alternating current circuit 1 and since the switch 43 is connected for antipolar operation, the electrical impulses will be initiated during half cycles of voltage of opposite polarity of the circuit 1. Furthermore, it is to be noted that the electrical impulses are generated when a previously nonconducting electric valve is rendered conducting, and that consecutive electrical impulses are initiated during half cycles of opposite polarity. For example, if electric valve 20 is rendered conductive during a positive half cycle of voltage of circuit 1 to generate one electrical impulse, the next positive half cycle of voltage impressed on control member 28 of electric valve 20 will be ineffective to generate a periodic impulse since the electric valve 20 is in a conducting condition, and that the circuit will retard the generation of the next electrical impulse 180 electrical degrees until electric valve 23 is rendered conductive, thereby initiating the succeeding electrical impulse during the negative half cycle of voltage of the alternating current circuit 1. In like manner, electric valve 23 will remain conducting until electric valve 20 is rendered conductive to generate the next succeeding electrical impulse during a positive half cycle of voltage of the alternating current circuit 1.

When switch 43 of circuit 12 is in the lower circuit position, that is in the unipolar operating position, the circuit 12 will operate to transmit trains of electrical impulses consecutive ones of which are initiated during half cycles of voltage of a predetermined polarity of the alternating current circuit 1.

Circuit 47 impresses on control members 11 of electric valves 7 and 8 a predetermined number of half cycles of alternating voltage which are of peaked wave form. The number of half cycles of voltage impressed thereon which are effective to render electric valves 7 and 8 conductive will be determined by the period of the electrical impulses impressed across control member 56 and the associated cathode by conductors 33 and 34 and will also depend upon the magnitude of the unidirectional biasing voltage impressed thereacross and which is obtained from that portion of the voltage divider including the lower portion of resistance 15 and resistance 17. The electric valves 53 and 54 will conduct current alternately to impress rectified impulses of alternating voltage across the electric valve 55 to energize primary winding 58 of transformer 57 alternately in opposite directions to induce alternating voltages of peaked wave form in secondary windings 59 and 60. It is to be noted that by adjusting the rotary phase shifter 52 the amount of energy transferred to the load circuit 2 from supply circuit 1 may be controlled. This control is effected by adjusting the time during each half cycle of voltage at which the electric valves 7 and 8 are rendered conductive during intervals of energization of the load circuit 2.

When the switch 64 is in the lower circuit position, the circuit 12 will operate to generate only a predetermined number of impulses or only one electrical impulse in response to the opening of switch 76. When the switch 76 is in the closed circuit position, electric valves 20 and 23 are maintained nonconductive by virtue of the negative unidirectional biasing potential impressed on control members 28 thereof which is sufficient in magnitude to render ineffective the alternating voltage impressed thereon by transformer 37. By moving the switch 76 to the open circuit position, the negative unidirectional biasing potential provided by circuit 63 will be substantially reduced in magnitude to permit the alternating voltages supplied by transformer 37 to render conductive electric valve 20 or 23, whichever is nonconducting. This decrease in the negative unidirectional biasing potential by the opening of switch 76 is effected by a circuit including the serially connected glow discharge valve 69, capacitance 70 and resistance 71 which are connected between the positive terminal 13 and the negative terminal 14 of the direct current source. When the switch 76 is opened there will appear momentarily across the terminals of the glow discharge valve 69 a unidirectional voltage substantially equal to the ignition voltage of the glow discharge valve. This ignition voltage is small compared with the voltage of the direct current source. The capacitance 70 will, therefore, be charged through a circuit including the serially connected glow discharge valve 69, capacitance 70 and resistance 71. As is well understood by those skilled in the art, the voltage appearing across the terminal of the glow discharge valve 69 when the valve is in a conducting condition will be a substantially constant value so that the voltage appearing thereacross for an appreciable time will be substantially constant. Capacitance 70 will be charged at a rate depending upon the constants of this circuit and the voltage appearing across glow discharge valve 69 will be maintained substantially constant until the rate of discharge of the capacitance 70 decreases to a value which is insufficient to maintain the voltage across the terminals of valve 69 at a value equal to, or slightly greater than, the current-maintaining voltage of valve 69. Immediately after the switch 76 is opened there will also be impressed on control members 28 of electric valves 20 and 23 a less negative voltage which, by virtue of the voltage divider including resistances 73 and 74, will be a predetermined component of the voltage appearing across glow discharge valve 69. This change in voltage in conjunction with the voltage supplied by transformer 37 will render either electric valve 20 or 23 conductive. After the electric valve 69 becomes nonconductive, the biasing potential impressed on control members 28 will increase exponentially in the negative direction so that the negative unidirectional biasing potential is sufficient in magnitude to render ineffective the alternating voltages supplied by transformer 37. The circuit 63 functions in this way to control the electric valves 20 and 23 irrespective of the time during which the switch 76 is maintained in the open circuit position and will render either electric valve 20 or 23 conductive if the switch is maintained in the open position for a minimum time of one cycle. Upon closing the switch 76, the capacitance 70 will discharge through a circuit including glow discharge valve 69, switch 76 and resistance 77. The time constant of this latter circuit is substantially smaller than the time constant of the charging circuit including resistance 71, thereby permitting practically instantaneous restoration of the circuit 63 to the initial condition.

Figure 2:
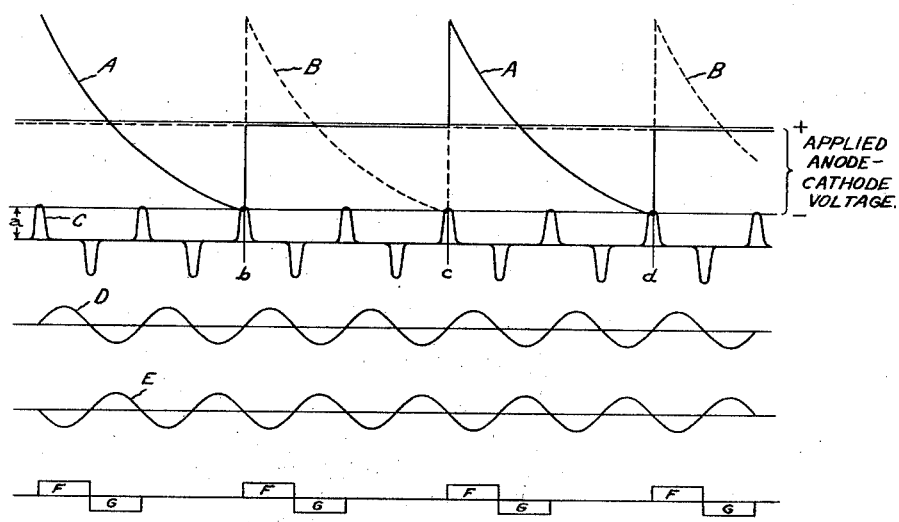

The operation of the arrangement of Fig. 1 may be better understood by considering the operating characteristics represented in Fig. 2 of the accompanying drawings. The operating characteristics of Fig. 2 are those for the system when circuit 12 is operating as a unipolar selector, that is, when switch 43 is in the lower position and when the arrangement thereof is functioning to effect periodic energization of the load circuit 2, that is, when the switch 64 is in the upper position. As was stated above, when movable contact 65 of switch 64 engages contact 66, circuit 12 will operate to generate a train of periodic electrical impulses of predetermined periodicity to control the energization of load circuit 2. For example this type of control may be employed in line or seam welding operations. Curve A represents the potential of cathode 27 of electric valve 20 and the dotted curve B represents the potential of cathode 27 of electric valve 23. Curve C represents the alternating voltage of peaked wave form impressed on control members 28 of electric valves 20 and 23. Since the switch 43 is in the unipolar position, these voltages will be in phase. Curves D and E represent the alternating voltages impressed across the anodes and cathodes of electric valves 7 and 8, respectively. The curve D may also be used to represent the voltage of alternating current circuit 1. The distance $a$ represents the negative unidirectional biasing potential impressed on control members 28 by the voltage divider. During the time preceding the position of line $b$, electric valve 23 is conductive and the capacitance 29 is being charged through a circuit including electric valve 23 and capacitance 29 and resistances 22, 21 and 19. At the time $b$, the potential of cathode 27 of electric valve 20 decreases sufficiently to permit the alternating voltage of peaked wave form to render electric valve 20 conductive. During the interval $b$—$c$, the electric valve 20 is conductive and the capacitance 29 is being charged through a circuit including electric valve 20, capacitance 29 and resistances 25, 24 and 19. At time $c$, the potential of cathode 27 of electric valve 23 decreases sufficiently to permit the voltage of peaked wave form to render electric valve 23 conductive. The electric valve 23 will, therefore, be conductive during the interval $c$—$d$. By virtue of this alternate charging of capacitance 29 in opposite directions, it is to be understood that there will be impressed on control member 56 of electric valve 55, through conductors 33 and 34, a periodic voltage to render electric valve 55 conductive during intervals established by this periodic voltage and the negative biasing potential obtained from the voltage divider including the lower portion of resistance 15 and resistance 17. Let it be assumed that the relationship between the periodic voltage generated and the unidirectional component is such that the electric valve 55 is rendered conductive for two half cycles of alternating voltage of peaked wave form introduced in circuit 47 by transformer 48, and that the electric valves 7 and 8 are rendered conductive to transmit current to load circuit 2 for one complete cycle. The current in the load circuit 2 transmitted by electric valve 7 may be represented by the spaces F, and the current in the load circuit 2 transmitted by the electric valve 8 may be represented by the spaces G. It is to be noted that the circuit 2 is intermittently energized for corresponding intervals of time and that the periods of energization begin during half cycles of the same polarity, that is, begin during positive half cycles of voltage of the alternating current circuit 1. This coordination is, of course, effected by means of circuit 12. It will be noted from observation of the operating characteristics of Fig. 2, particularly curves A and B, that the periodic voltage produced by the circuit 12 may be of a periodicity different from that of the alternating current circuit 1. More specifically, the periodicity or frequency of the periodic voltage provided by circuit 12 may be less than the periodicity of the voltage of circuit 1, and, of course, the period of the voltage will be correspondingly greater.

Figure 3:
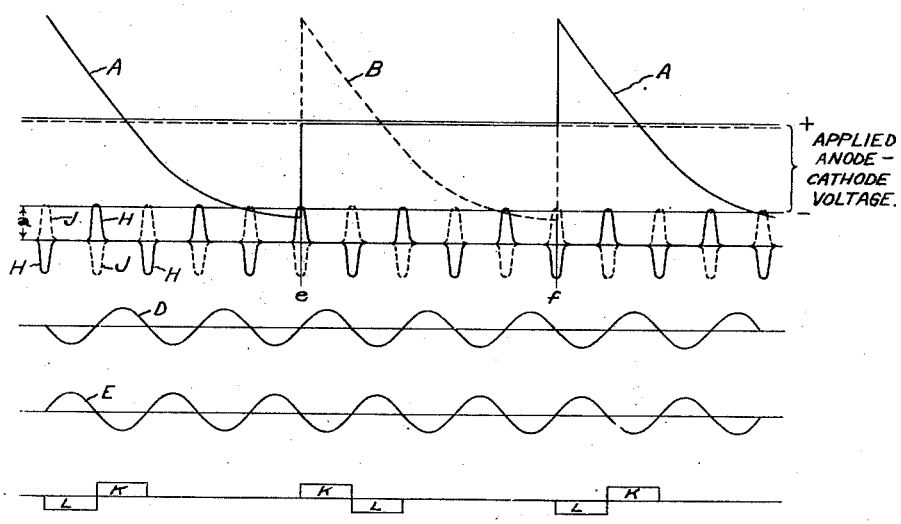

The operating characteristics shown in Fig. 3 are those relating to the operation of the circuit of Fig. 1 when switch 43 is in the upper position, that is, in the antipolar operating position, so that succeeding or consecutive energizations of the load circuit 2 begin during half cycles of voltage of opposite polarity of circuit 1. The curve H represents the alternating voltage of peaked wave form impressed on control member 28 of electric valve 20 by transformer 37, and the dotted curve J represents the alternating voltage of peaked wave form impressed on control member 28 of electric valve 23 by transformer 37. Prior to the time represented by the position of line $e$, electric valve 23 is conducting. Electric valve 20 will be rendered conductive at time $e$ to generate an electrical impulse but the immediately preceding positive peaked voltage of curve J will not be effective to generate an electrical impulse since the potential of cathode 27 of electric valve 23 is positive relative to that of anode 26 and since electrical impulses are generated only when a previously nonconducting electric valve is rendered conductive, the initiation of the electrical impulse is retarded until the succeeding half cycle of voltage of circuit 1. In like manner, electric valve 23 will be rendered conductive at time $f$ to generate an electrical impulse. Spaces K represent the current in the load circuit 2 conducted by electric valve 7 and spaces L represent the current conducted by electric valve 8. It is to be noted that the intermittent periods of energization of the load circuit 2 as represented by these spaces begin during half cycles of voltage of opposite polarity of circuit 1.

Figure 4:
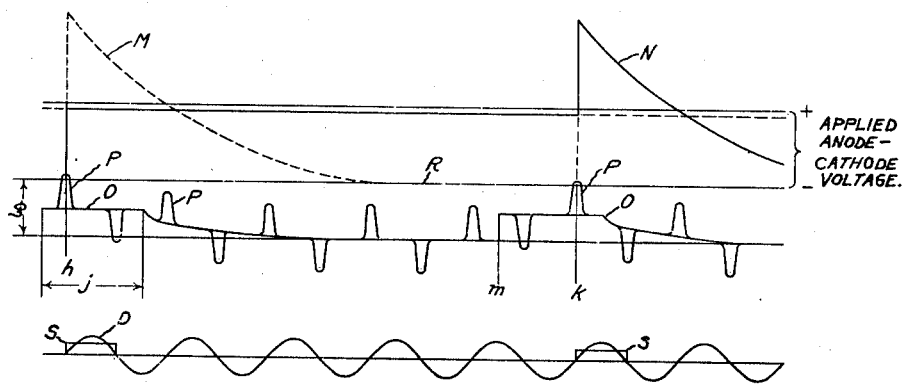

The operating characteristics represented in Fig. 4 relate to the operation of the arrangement of Fig. 1 when switch 43 is in the lower position for establishing unipolar operation and when switch 64 is in the lower position to permit the generation of only one electrical impulse in response to a single circuit controlling operation. Curve M represents the potential of cathode 27 of electric valve 23 and curve N represents the potential of cathode 27 of electric valve 20. The distance g represents the negative unidirectional biasing potential impressed on control members 28 of electric valves 20 and 23 when the circuit 63 furnishes its maximum negative biasing potential, and the curve O represents the resultant negative biasing potential provided by circuit 63 after one circuit controlling operation as, for example, after the switch 76 has been moved to the open circuit position. Curve P represents the alternating voltages of peaked wave form impressed on control members 28 of electric valves 20 and 23 and line R represents the potential at which the voltages of peaked wave form impressed on the control members are effective to render the electric valves 20 and 23 conductive. Let it be assumed that electric valve 20 is rendered conductive at time h and that one half cycle of current is transmitted to the load circuit 2 by electric valve 7 and that the current transmitted thereby is represented by space S. The impulse of voltage generated by circuit 12 renders electric valve 55 conductive for a half cycle of voltage and impresses on control member 11 of electric valve 7 a half cycle of voltage. Due to the operation of the circuit 63, the decrease in the negative biasing potential impressed on control members 28 will be effective for only a predetermined time corresponding to the interval j so that subsequent positive half cycles of voltage of peaked wave form supplied by transformer 27 will be ineffective to render electric valve 20 or 23 conductive. Electric valve 20 will continue to conduct current until time k. This sequence of operation will be initiated by the operation of the switch 76 to the open circuit position, even though the switch is open for a relatively short interval of time. Upon closing the switch 76, the capacitance 70 will discharge through the circuit including glow discharge valve 69, switch 76 and resistance 77, thereby restoring the circuit 63 to its original condition to permit a corresponding cycle of control to be initiated upon the subsequent operation of switch 76. Let it be assumed that at time m switch 76 is again opened to effect the temporary reduction in negative biasing potential. The next succeeding positive half cycle of voltage of peaked wave form provided by transformer 27 will render electric valve 23 conductive to generate an impulse of voltage which in turn will render electric valve 55 conductive for a half cycle of voltage and will impress on control member 11 of electric valve 7 a voltage to render that valve conductive for a half cycle. It is to be noted that the energizations of the load circuit 2, as represented by curve S, occur during half cycles of voltage of the same polarity of circuit 1.

Figure 5:
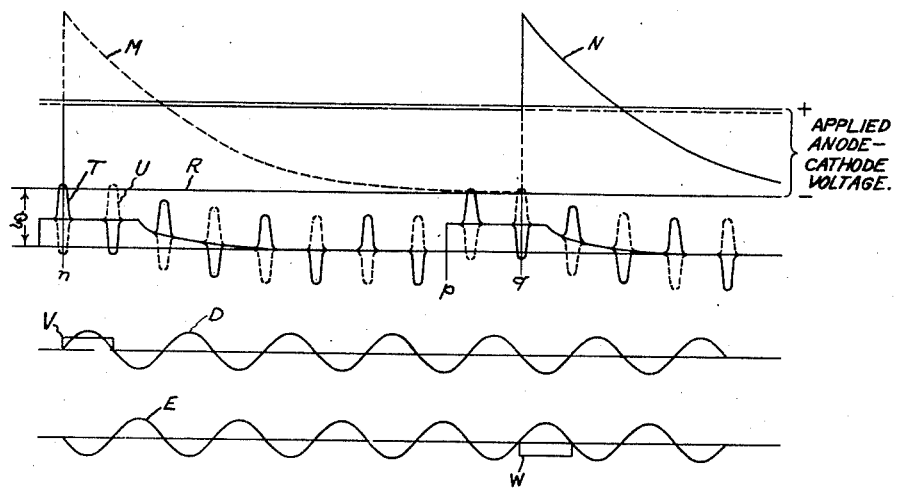

The operating characteristics represented in Fig. 5 relate to the operation of the arrangement of Fig. 1 when switch 43 is in the upper position, that is, in the antipolar operating position and when switch 64 is in the lower position. Curve T represents the alternating voltage of peaked wave form impressed on control member 28 of electric valve 20 and the dotted curve U represents the alternating voltage of peaked wave form impressed on control member 28 of electric valve 23. After switch 76 is opened, electric valve 20 will be rendered conductive at time n to generate an electrical impulse which eventually renders electric valve 7 conductive. By virtue of circuit 63 only one electrical impulse is generated. At time p, if the switch 76 is again moved to the open circuit position, circuit 63 will reduce the negative biasing potential to permit the next positive half cycle of voltage impressed on control member 28 of electric valve 23 to render this valve conductive to generate another electrical impulse beginning at time q. The immediately preceding positive voltage impressed on control member 28 of electric valve 20 will not be effective to render electric valve 20 again conductive since electric valve 20 is in a conducting condition. Under these conditions of operation, consecutive energizations of the load circuit 2 are initiated during half cycles of voltage of opposite polarity of the alternating current circuit 1. For example, the space V represents the current in the load circuit 2 due to the conduction of current by electric valve 7, and space W represents the current in the load circuit 2 when electric valve 8 conducts subsequently.

Fig. 6 of the accompanying drawings diagrammatically represents another embodiment of my invention which is similar in many respects to the arrangement shown in Fig. 1 and corresponding elements have been assigned like reference numerals. In the arrangement of Fig. 6, I provide a suitable inductive device, such as a transformer 78, which is connected in the anode-cathode circuits of electric valves 20 and 23 to supply the electrical impulses which control main or power electric valves. The transformer 78 may include a primary winding 79 and a secondary winding 80. Electric valves 81 and 82 for controlling the voltage impressed on transformer 3 are shown as being of the type employing an ionizable medium, such as mercury vapor, and each comprises an anode 83, a mercury pool cathode 84 and a control member 85 of the immersion-ignitor type. Electric valves 81 and 82 are connected reversely in parallel to permit the transfer of both half cycles of current to the load circuit 2. Control electric valves 86 and 87 are connected across the anodes 83 and control members 85 of electric valves 81 and 82, respectively. Electric valves 86 and 87 are preferably of the type employing an ionizable medium, such as a gas or a vapor, and each includes an anode 88, a cathode 89 and a control member 90. Impulses of voltage generated by the circuit 12 are impressed on control member 90 of electric valve 86 through a circuit including the left-hand portion of secondary winding 80 of transformer 78 and periodic control voltages are impressed on control member 90 of electric valve 87 through a circuit including the right-hand portion of winding 80. Suitable sources of negative biasing potential, such as batteries 91, may be connected in circuit with control members 90 and current limiting resistances 92 may be connected in series relation therewith if desired. Capacitances 93 are connected across control members 90 and cathodes 89 of electric valves 86 and 87 to suppress extraneous transient voltages. Current limiting resistances 94 and suitable protective means, such as fuses 95, may be connected in series relation with electric valves 86 and 87 to protect these valves.

The operation of the embodiment of my invention diagrammatically shown in Fig. 6 is similar in many respects to that described in connection with the illustrated embodiment of my invention shown in Fig. 1. The switch 43 may be positioned to effect either unipolar or antipolar operation and the switch 64 may be positioned to effect intermittent or periodic energization of the load circuit 2 or to supply only one impulse of current to the load circuit 2. The operation of the system in these respects is substantially the same as that explained in connection with Fig. 1. The transformer 78 utilizes the impulses of current transmitted by the electric valves 20 and 23 to generate other electrical impulses to render electric valve 86 or electric valve 87 conductive to render conductive electric valve 81 or 82. For example, if it is desired to effect intermittent or periodic energization of the load circuit 2 during half cycles of voltage of opposite polarity of circuit 1, the switches 43 and 64 will be moved to the upper positions and circuit 12 will function to control electric valves 86 and 87 to accomplish this result. By placing switch 43 in the lower position unipolar energization of the load circuit 2 may be effected, and by placing switch 64 in the lower position the circuit 12 will generate only one electrical impulse in response to a single actuation of switch 76 to effect energization of the load circuit 2 during only one half cycle of voltage of circuit 1.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an alternating current supply circuit, a load circuit, electric translating apparatus interposed between said circuits for controlling the transfer of energy therebetween including a pair of oppositely disposed electric valves, and means for supplying a periodic control voltage to render said electric valves conductive periodically for predetermined intervals of time including a source of direct current, a pair of parallel electric paths connected to said source each comprising a serially connected electric valve and an impedance element, a current commutating capacitance connected across said paths and an excitation circuit for the electric valves in said parallel paths for controlling the conductivities thereof to initiate the generation of said periodic control voltage so that consecutive intervals of conduction of said first mentioned electric valves begin during half cycles of voltage of opposite polarity.

2. In combination, an alternating current supply circuit, a load circuit, electric translating apparatus interposed between said circuits for controlling the transfer of energy therebetween including a pair of electric valve means reversely connected in parallel, said electric valve means being provided with control members to control the conductivities thereof, and means for supplying a periodic control voltage for energizing said control members to render said electric valve means alternately conductive during predetermined intervals of time including a source of direct current, a pair of parallel electric paths connected to said direct current source each comprising a serially connected electric valve having a control member and an impedance element, the impedance elements being adjustable to control the period of said periodic voltage, a capacitance connected across said parallel paths to commutate the current therebetween and an excitation circuit for impressing on the control members of the electric valves in said parallel paths alternating voltages displaced 180 electrical degrees to initiate the generation of the impulses of said periodic control voltages so that consecutive intervals of conduction of said first mentioned electric valve means begin during half cycles of voltage of opposite polarity.

3. In combination, an alternating current circuit, and a circuit including means for generating electrical impulses of a periodicity different from that of said alternating current circuit and comprising a source of current, a pair of parallel electric paths energized from said source and each including a serially connected impedance element, an electric valve having a control member, said parallel paths being arranged to conduct current alternately so that current is continuously transmitted from said source through one or the other of said parallel paths and means for effecting commutation of current between said paths, and means energized from said alternating current circuit for selectively controlling the time at which the electric valves are rendered conductive to initiate the generation of said electrical impulses during only half cycles of voltage of opposite polarity of said alternating current circuit.

4. In combination, an alternating current circuit, and a circuit including means for generating electrical impulses comprising a source of direct current, a pair of parallel electric paths energized from said source and each including a serially connected impedance element, an electric valve, said parallel paths being arranged to conduct current alternately so that current is continuously transmitted from said source through one or the other of said parallel paths and a capacitance connected across said parallel paths and arranged to be charged alternately in opposite directions from said source, and means energized from said alternating current circuit for selectively controlling the time at which the electric valves are rendered conductive to initiate the generation of said electrical impulses during only half cycles of voltage of opposite polarity of said alternating current circuit and for controlling the time during said half cycles of opposite polarity at which said electrical impulses are initiated.

5. In combination, an alternating current circuit, and a polarity selector including means comprising a source of direct current, a pair of parallel electric paths each including a serially connected electric valve having a control member and an impedance element, a capacitance connected across said paths and arranged to be charged alternately in opposite directions from said source through the electric valves to provide electrical impulses during the periods of charging and means energized from said alternating current circuit for impressing on the control member of one of the electric valves a voltage tending to render that valve conductive during positive half cycles of voltage of said alternating current circuit and for impressing on the control member of the other electric valve a voltage tending to render that electric valve conductive during negative half cycles of voltage of said alternating current circuit so that said paths are rendered conducting alternately to generate a train of electrical impulses of a periodicity different from that of said alternating current circuit and of which consecutive impulses are initiated during only half cycles of voltage of opposite polarity of said alternating current circuit.

6. In combination, an alternating current circuit, and a circuit including means for generating electrical impulses of a periodicity less than that of said alternating current circuit and comprising a source of direct current, a pair of parallel electric paths each including a serially connected electric valve having a control member and an impedance element, a capacitance connected across said paths and arranged to be charged alternately in opposite directions from said source through the electric valves to generate electrical impulses during the periods of charging and each being arranged to conduct current until the other path is rendered conducting and means energized from said alternating current circuit for impressing on the control member of one of the electric valves an alternating voltage tending to render that valve conductive during positive half cycles of voltage of said alternating current circuit and for impressing on the control member of the other electric valve an alternating voltage tending to render that valve conductive during negative half cycles of voltage of said alternating current circuit, a relatively positive voltage on the control member of a conducting electric valve being ineffective to generate an electrical impulse to effect thereby a retardation in the time of occurrence of the succeeding impulse so that consecutive impulses occur during half cycles of voltage of opposite polarity of the alternating current circuit.

7. In a circuit including means for generating electrical impulses of which consecutive impulses are initiated during half cycles of voltage of opposite polarity of an associated alternating current circuit comprising a source of direct current, a pair of parallel electric paths connected to said source and each including a serially connected electric valve and an impedance element, each of the electric valves being provided with a control member to control the conductivity thereof, a capacitance connected across said parallel circuits, and an excitation circuit including means energized from the alternating current circuit for impressing on the control members of the electric valves alternating voltages of peaked wave form displaced 180 electrical degrees, said parallel paths being arranged to conduct current alternately and each being arranged to conduct current from said source through the associated impedance element to prevent the generation of electrical impulses until the other of said parallel paths is rendered conducting.

8. In a polarity selector for providing electrical impulses of which consecutive impulses are initiated during half cycles of voltage of opposite polarity of an associated alternating current circuit, the combination of a source of direct current, a pair of parallel electric paths connected to said source and each including a serially connected electric valve, having a control member, and an impedance element, a capacitance connected across said parallel paths for effecting commutation of current therebetween, said parallel paths being arranged to conduct current alternately and arranged so that current is transmitted continuously through said paths from said source, and an excitation circuit energized from said alternating current circuit for impressing on the control members of the electric valves in said parallel paths alternating voltages displaced 180 electrical degrees to render said valves conductive for effecting discharge of said capacitance to provide an electrical impulse, said impulses being generated only when a previously nonconducting electric valve is rendered conductive, and including means for adjusting the phase of said alternating voltages relative to the voltage of said alternating current circuit.

9. In combination, an alternating current circuit, a circuit for providing a train of electrical impulses of which consecutive impulses are initiated during half cycles of voltage of opposite polarity of said alternating current circuit comprising a source of direct current, a pair of parallel electric paths connected to said source and each including a serially connected electric valve and an impedance element, said electric valves each having a control member for rendering the associated electric valve conductive, a capacitance connected across said paths, said electric valves being arranged to conduct current alternately to charge said capacitance in opposite directions to generate the electrical impulses, and an excitation circuit energized from said alternating current circuit for impressing on the control members of the electrical valves alternating voltages displaced 180 electrical degrees tending to render one of said valves conducting during positive half cycles of voltage of said alternating current circuit and tending to render the other of said valves conducting during negative half cycles thereof, said electrical impulses being generated only when a previously nonconducting electric valve is rendered conductive, and including means for adjusting the phase of said alternating voltages relative to the voltage of said alternating current circuit.

10. In combination, an alternating current circuit, and a circuit including means for generating a train of electrical impulses of a frequency less than that of said alternating current circuit and of which consecutive impulses begin during half cycles of voltage of opposite polarity of the alternating current circuit comprising a source of direct current, a voltage divider including a resistance connected across said source, a pair of parallel electric paths connected to said source each including a serially-connected electric valve having a control member and an impedance element, a capacitance connected across said parallel paths and an excitation circuit including means for impressing a predetermined negative component of the voltage of said voltage divider on the control members of the electric valves in said parallel paths tending to maintain the valves nonconducting and means energized from said alternating current circuit for impressing on the control members alternating voltages displaced 180 electrical degrees to render said valves conductive, said parallel paths being arranged to conduct current alternately and each being arranged to conduct current until the other path is rendered conducting.

11. In a circuit for generating electrical impulses during only half cycles of voltage of a predetermined polarity of an alternating current circuit the combination of, a source of direct current, a pair of parallel electric paths connected to said source and each including a serially connected electric valve having a control member and an impedance element, a capacitance connected across said parallel paths, and an excitation circuit energized from the alternating current circuit for impressing on the control members of the electric valves in-phase alternating voltages, said parallel paths being arranged to conduct current alternately and each being arranged to conduct current from said source through said associated impedance element to prevent the generation of an electrical impulse until the other of said parallel paths is rendered conducting.

12. In a polarity selector for generating electrical impulses of which consecutive impulses begin during half cycles of voltage of opposite polarity of an associated alternating current circuit, the combination of a source of direct current, a pair of serially connected impedance elements having the common juncture thereof connected to one terminal of said direct current source, a capacitance connected across said serially connected impedance elements, a pair of electric valves, having control members, connected to the other terminal of said direct current source and each being connected to a different terminal of said capacitance and for alternately charging said capacitance in opposite directions to provide the electrical impulses, and means for controlling the times of occurrence of the electrical impulses comprising an excitation circuit energized from the alternating current circuit and including a transformer and a phase shifting device for impressing on said control members adjustable alternating voltages of peaked wave form displaced 180 electrical degrees.

13. In a polarity selector for generating electrical impulses beginning during half cycles of a predetermined polarity of an associated alternating current circuit, the combination of a source of direct current, a pair of serially connected impedance elements having the common juncture thereof connected to one terminal of said direct current source, a capacitance connected across said serially connected impedance elements, a pair of electric valves, having control members, connected to the other terminal of said direct current source and each being connected to a different terminal of said capacitance for alternately charging said capacitance in opposite directions to provide the electrical impulses, and means for controlling the times of occurrence of the electrical impulses comprising an excitation circuit energized from the alternating current circuit for impressing on said control members in-phase alternating voltages to render the nonconducting electric valve conductive.

14. In a circuit for initiating the generation of electrical impulses only during half cycles of voltage of a predetermined polarity of an associated alternating current circuit, the combination of a source of direct current, a capacitance, a pair of serially connected impedance elements connected across said capacitance, the common juncture of said impedance elements being connected to one terminal of said direct current source, a pair of electric valves connected to the other terminal of said direct current source and each being connected to a different terminal of said capacitance for alternately charging said capacitance from said source through said impedance elements, said electric valves being provided with control members for rendering the electric valves conductive, an excitation circuit for impressing on said control members in-phase alternating voltages to render said electric valves conductive to generate electrical impulses, said electrical impulses being generated only when a previously nonconducting electric valve is rendered conductive, and means for controlling the phase of said alternating voltages impressed on said control members.

15. In combination, an alternating current circuit, and a polarity selector comprising a source of direct current, a pair of parallel paths each including a serially connected electric valve having a control member and an impedance element, a capacitance connected across said paths and arranged to be charged alternately in opposite directions from said source through the electric valves to provide electrical impulses during the periods of charging, means for impressing on the control member of one of the electric valves an alternating voltage tending to render that valve conductive during positive half cycles of voltage of said alternating current circuit and for impressing on the control member of the other electric valve an alternating voltage tending to render this valve conductive during negative half cycles of voltage of said alternating current circuit so that said paths are rendered conducting alternately to generate electrical impulses of which consecutive impulses begin during half cycles of voltage of opposite polarity of said alternating current circuit and means comprising a pair of serially connected capacitances connected across said parallel paths for providing a positive potential irrespective of which path is rendered conductive.

16. In a circuit for generating electrical impulses during only half cycles of voltage of a predetermined plarity of an associated alternating current circuit, the combination of a source of direct current, a pair of parallel electric paths connected to said source and each including a serially connected electric valve having a control member and an impedance element, a capacitance connected across said parallel paths, an excitation circuit energized from said alternating current circuit for impressing on the control members of the electric valves in-phase alternating voltages, said parallel paths being arranged to conduct current alternately and each being arranged to conduct current from said source through said associated impedance element to prevent the generation of electrical impulses until the other of said parallel paths is rendered conducting and a voltage divider comprising a pair of serially connected capacitances connected across said parallel paths for providing a positive potential irrespective of which path is rendered conductive.

17. In combination, an alternating current circuit, and a circuit for generating electrical impulses comprising a source of direct current, a pair of parallel electric paths each including an impedance element and a serially connected electric valve having a control member, a capacitance connected across said parallel electric paths and arranged to be charged alternately in opposite directions from said source through the electric valves to generate electrical impulses during the periods of charging and each arranged to conduct current until the other path is rendered conductive and an excitation circuit energized from said alternating current circuit for selectively energizing the control members of the electric valves to cause consecutive electrical impulses to be generated during half cycles of voltage of opposite polarity or during half cycles of voltage of the same polarity of the alternating current circuit.

18. In combination, an alternating current circuit, a circuit for generating electrical impulses having a predetermined time relationship relative to the voltage of said alternating current circuit comprising a source of direct current, a pair of parallel electric paths each including an impedance element and a serially connected electric valve having a control member, a capacitance connected across said paths and arranged to be charged alternately in opposite directions from said source through the electric valves to generate electrical impulses during the periods of charging and each being arranged to conduct current until the other path is rendered conductive, and an excitation circuit energized from said alternating current circuit for impressing on the control members of the electric valves alternating voltages to render said electric valves conductive comprising means for impressing on said control members in-phase alternating voltages to initiate the generation of consecutive electrical impulses during half cycles of voltage of like polarity of said alternating current circuit and means for reversing the phase of the voltage impressed on the control member of one of the electric valves so that the voltages impressed on said control members are displaced 180 electrical degrees to initiate the generation of consecutive electrical impulses during half cycles of voltage of opposite polarity of said alternating current circuit.

19. In an excitation circuit for an electric valve means having a control member, the combination of means for impressing on said control member a periodic voltage tending to render said electric valve means conductive, means for impressing on said control member a biasing potential sufficient to render ineffective said periodic voltage to maintain said electric valve means nonconductive, and a control circuit for effecting a transient reduction in the value of said biasing potential comprising a source of direct current, a serially connected capacitance and a glow discharge valve connected across said source and a circuit connected in parallel with said capacitance including means for opening said parallel circuit to initiate the reduction in said biasing potential.

20. In combination, a circuit for generating electrical impulses comprising an electric valve means having a control member, and an excitation circuit for energizing said control member comprising means for impressing on said control member a periodic voltage tending to render said electric valve means conductive, means for impressing on said control member a negative unidirectional biasing voltage sufficient to overcome said periodic voltage to maintain said electric valve means nonconductive and means comprising a source of direct current and a serially connected capacitance and a glow discharge valve energized from said direct current source for decreasing said biasing potential to permit said periodic voltage to render said electric valve means conductive.

21. In an excitation circuit for an electric valve means having a control member, the combination of means for impressing on said control member a periodic voltage tending to render said electric valve means conductive, means for impressing on said control member a negative unidirectional biasing potential sufficient to overcome said periodic voltage, and means for effecting a transient reduction in the value of said biasing potential comprising a source of direct current, a serially connected capacitance and a glow discharge valve connected across said source and a circuit connected in parallel with said capacitance including a switch for opening the parallel circuit to initiate the reduction in said negative unidirectional biasing potential.

22. In combination, an electric valve means having a control member, means for impressing on said control member a periodic voltage tending to render said electric valve means conductive, means for impressing on said control member a negative unidirectional biasing potential sufficient to overcome said periodic voltage and tending to maintain said electric valve means nonconductive, and a control circuit comprising a source of direct current, a serially connected capacitance and a glow discharge valve connected across said source, a normally closed circuit connected in shunt relation with said capacitance and means connected in the control circuit for interrupting said circuit to permit charge of said capacitance from said source through said glow discharge valve to effect a transient reduction in the value of said biasing potential.

23. In combination, an electric valve means having a control member, means for impressing on said control member a periodic voltage tending to render said electric valve means conductive, means for impressing on said control member a negative unidirectional biasing potential sufficient to render ineffective said periodic voltage and a control circuit comprising a source of direct current, a serially connected resistance, capacitance and a glow discharge valve connected to said source, a circuit connected in shunt relation with said capacitance for initiating the charge of said capacitance from said source through said resistance and said glow discharge valve, and ..1eans responsive to the voltage across said glow discharge valve for effecting a transient reduction in the value of said negative unidirectional biasing potential.

24. In combination, a circuit for generating an electrical impulse comprising a source of direct current, a voltage divider connected across said source, a capacitance, an electric valve means having a control member for charging said capacitance from said source, means for effecting discharge of said capacitance, an excitation circuit comprising means for impressing on said control member a periodic voltage tending to render said electric valve conductive, means for impressing on said control member a biasing potential sufficient to overcome said periodic voltage to maintain said electric valve nonconductive, and means for decreasing said biasing potential to permit said periodic voltage to render said electric valve means conductive comprising a serially connected capacitance and a glow discharge valve energized from said direct current source.

25. In an excitation circuit for an electric valve means having a control member, the combination of means for impressing on said control member a periodic voltage tending to render said electric valve means conductive, means for impressing on said control member a negative unidirectional biasing potential sufficient to overcome said periodic voltage, means for effecting a transient reduction in the value of said biasing potential comprising a source of direct current, a serially connected capacitance and a glow discharge valve connected across said source, and a circuit for discharging said capacitance through said glow discharge valve after said capacitance has been charged from said source.

26. In combination, an electric valve means having a control member, means for impressing on said control member a periodic voltage tending to render said electric valve means conductive, a source of direct current, a voltage divider connected across said source of direct current, means for impressing on said control member a negative unidirectional biasing potential derived from said voltage divider sufficient to render ineffective said periodic voltage and tending to maintain said electric valve means nonconductive, and a control circuit for effecting a transient reduction in the value of said biasing potential comprising a serially connected resistance, a capacitance and a glow discharge valve connected across said source, a resistance of relatively large value connected across said glow discharge valve, a voltage divider connected across said glow discharge valve for modifying said biasing potential in accordance with the voltage appearing across said glow discharge valve and a circuit including said second mentioned voltage divider connected in parallel with said capacitance including means for opening the parallel circuit to initiate the transient reduction in the biasing potential.

27. In combination, an alternating current circuit, and a circuit including means for generating electrical impulses of a period greater than that of said alternating current circuit and comprising a source of direct current, a pair of parallel electric paths each including a serially connected impedance element and an electric valve having a control member, a capacitance connected across said paths and arranged to be charged alternately in opposite directions from said source through said paths to generate electrical impulses during the periods of charge and each being arranged to conduct current until the other path is rendered conducting, means energized from said alternating current circuit for impressing on the control member of one of the electric valves an alternating voltage tending to render that valve conductive during positive half cycles of voltage of said alternating current circuit and for impressing on the control member of the other electric valve an alternating voltage tending to render that valve conductive during negative half cycles of voltage of said alternating current circuit and inductive means responsive to an electrical condition of the anode-cathode circuits of the electric valves.

28. In combination, an alternating current circuit, a load circuit, a pair of electric valves reversely connected in parallel for controlling the transfer of energy between said circuits, and a circuit for controlling the conductivity of said electric valves comprising a source of direct current, a pair of parallel electric paths each including a serially connected impedance element and an electric valve means having a control member, a capacitance connected across said paths and arranged to be charged alternately in opposite directions from said source through said paths, means energized from said alternating current circuit for impressing on the control member of the electric valve in one of the paths a voltage tending to render that electric valve means conductive during positive half cycles of voltage of said alternating current circuit and for impressing on the control member of the electric valve in the other of said parallel paths a voltage tending to render that valve conductive during negative half cycles of voltage of said alternating current circuit and inductive means connected in said parallel paths for supplying periodic electrical quantities to render said first mentioned electric valves conductive so that consecutive energizations of said load circuit are initiated during half cycles of voltage of opposite polarity of said alternating current circuit.

29. In combination, an alternating current circuit, a load circuit, electric translating apparatus interposed between said circuits for controlling the transfer of energy therebetween and including a pair of oppositely disposed electric valves, means for supplying a periodic control voltage to render said electric valves conductive periodically for predetermined intervals of time including a source of direct current, a pair of parallel electric paths connected to said source each comprising a serially connected electric valve and an impedance element, a current commutating capacitance connected across said parallel paths and an excitation circuit for the electric valves in said parallel paths for controlling the conductivities thereof to initiate the generation of said periodic control voltage so that consecutive intervals of conduction of said first mentioned electric valves begin during half cycles of voltage of predetermined polarity.

30. In combination, an alternating current supply circuit, a load circuit, electric translating apparatus interposed between said circuits for controlling the transfer of energy therebetween and including a pair of oppositely disposed electric valves, means for supplying a periodic control voltage to render said electric valves conductive periodically for predetermined intervals of time including a source of direct current, a pair of parallel electric paths connected to said source each comprising a serially connected electric valve and an impedance element, a current commutating capacitance connected across said parallel paths, an excitation circuit for the electric valves in said parallel paths for controlling the conductivities thereof to initiate the generation of said periodic control voltage so that consecutive intervals of conduction of said first mentioned electric valve begin during half cycles of voltage of predetermined polarity, means for impressing on the control members a biasing potential sufficient to render ineffective said excitation circuit to maintain said first mentioned electric valves nonconductive, and a control circuit for effecting a transient reduction in the value of said biasing potential comprising a serially connected capacitance and a glow discharge valve connected across said source of direct current and a circuit connected in parallel with said capacitance including means for opening said parallel circuit to initiate the reduction in said biasing potential.

HAROLD W. LORD.